Figure 1:
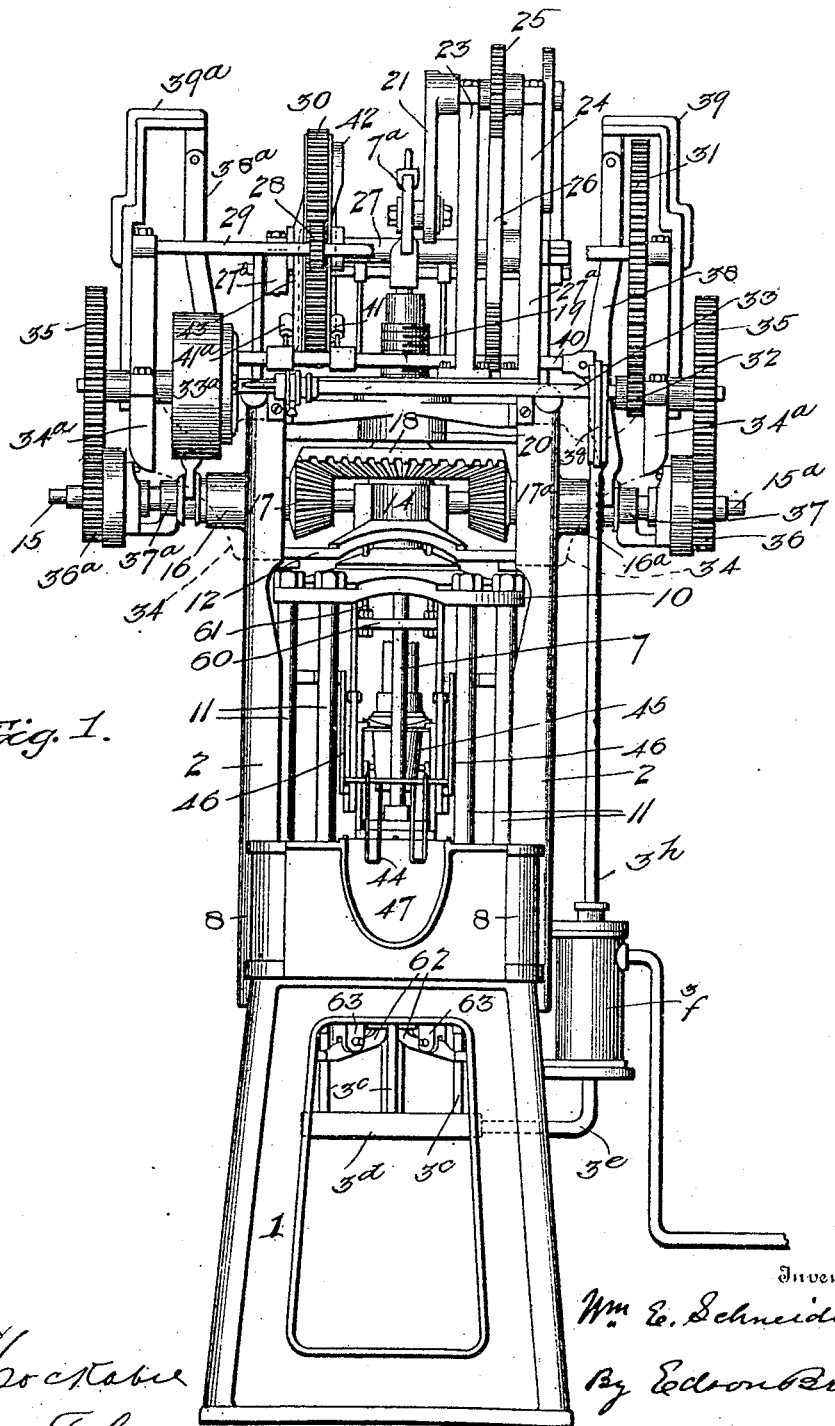

No. 847,832. PATENTED MAR. 19, 1907.
W. E. SCHNEIDER.
MACHINE FOR MAKING RECEPTACLES OF COMPRESSED PULP.
APPLICATION FILED JUNE 30, 1906.

11 SHEETS—SHEET 1.

Witnesses
T. L. McKabie
James F. Crown

Inventor
Wm. E. Schneider
By Edson Bros
Attorneys

No. 847,832. PATENTED MAR. 19, 1907.
W. E. SCHNEIDER.
MACHINE FOR MAKING RECEPTACLES OF COMPRESSED PULP.
APPLICATION FILED JUNE 30, 1906.

11 SHEETS—SHEET 3.

No. 847,832. PATENTED MAR. 19, 1907.
W. E. SCHNEIDER.
MACHINE FOR MAKING RECEPTACLES OF COMPRESSED PULP.
APPLICATION FILED JUNE 30, 1906.

11 SHEETS—SHEET 4.

No. 847,832.  
PATENTED MAR. 19, 1907.

W. E. SCHNEIDER.  
MACHINE FOR MAKING RECEPTACLES OF COMPRESSED PULP.  
APPLICATION FILED JUNE 30, 1906.

11 SHEETS—SHEET 5.

Witnesses  
Inventor  
Wm. E. Schneider  
By Edson Bros.  
Attorneys

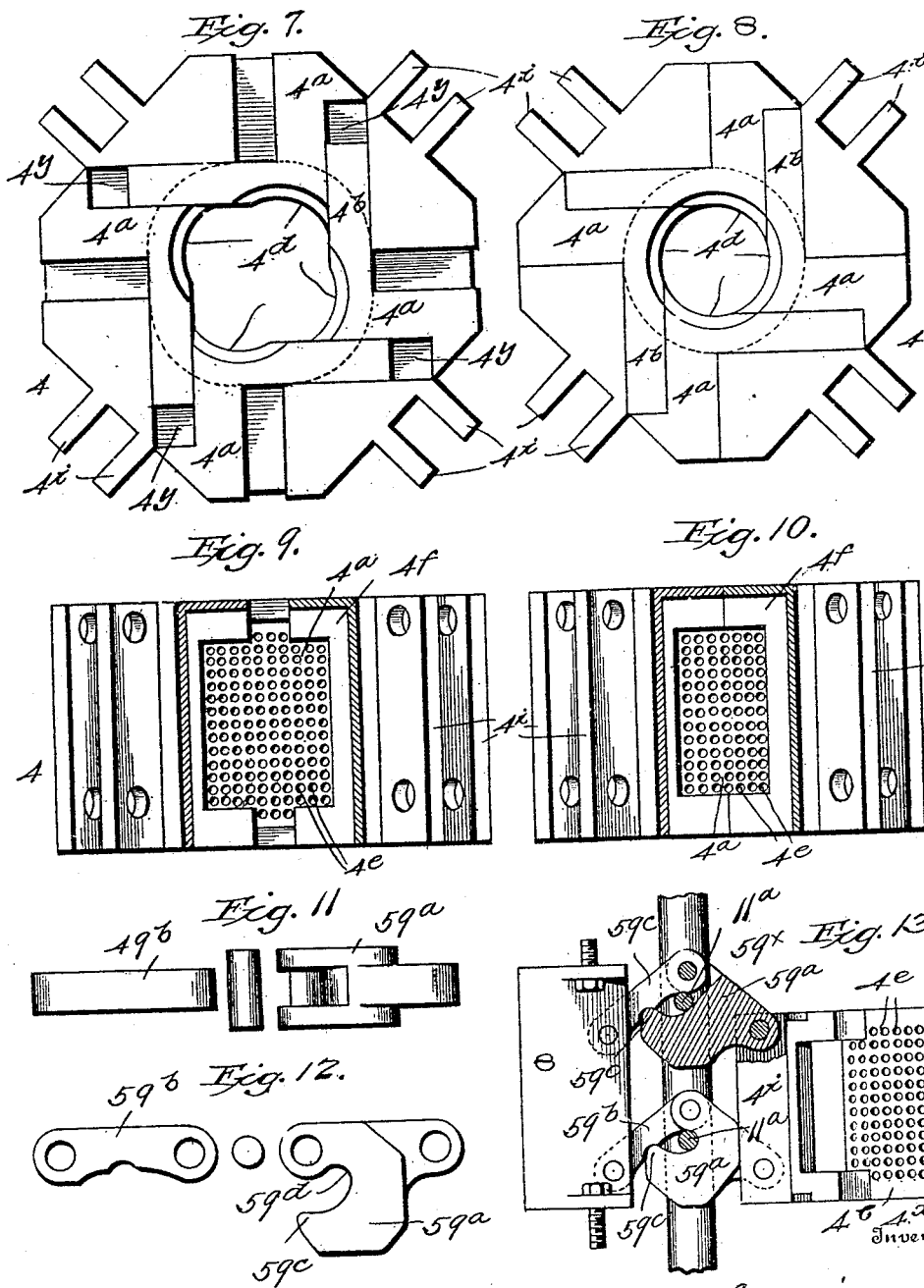

No. 847,832. PATENTED MAR. 19, 1907.
W. E. SCHNEIDER.
MACHINE FOR MAKING RECEPTACLES OF COMPRESSED PULP.
APPLICATION FILED JUNE 30, 1906.
11 SHEETS—SHEET 7.
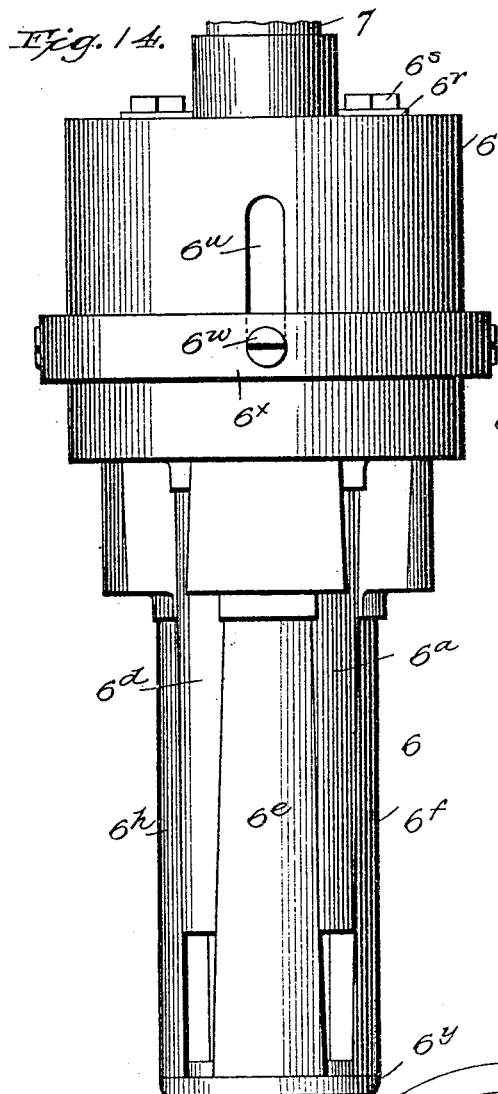
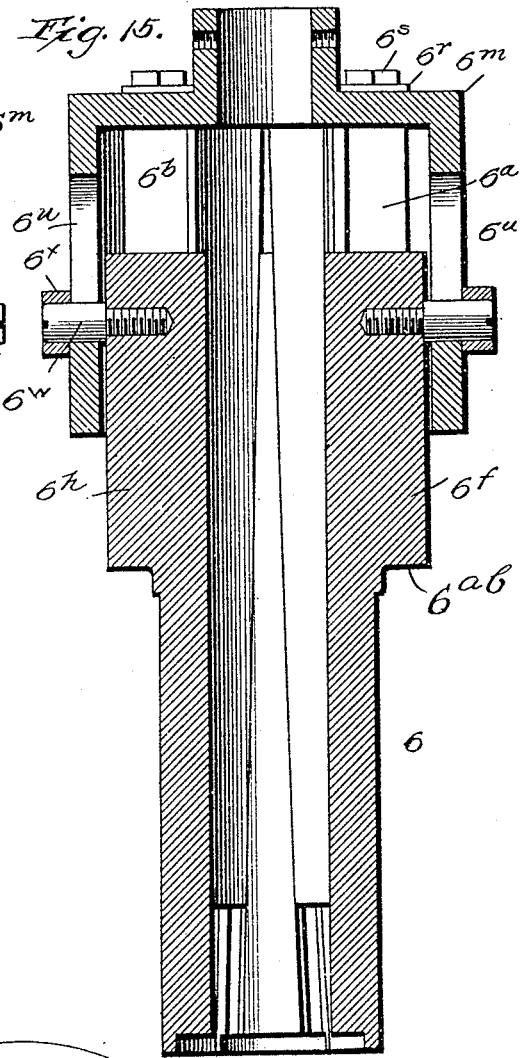
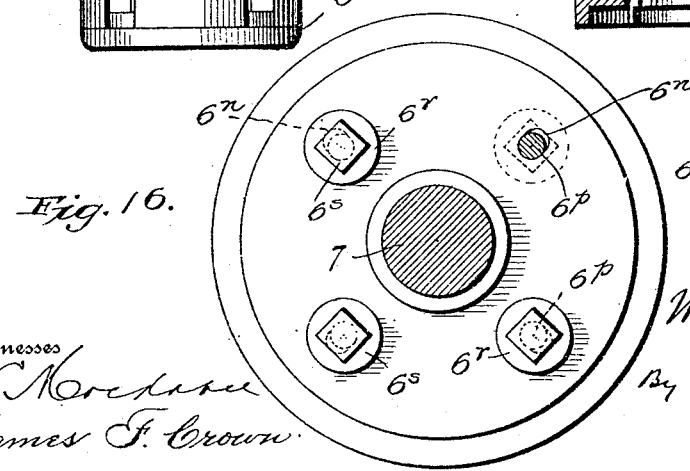

No. 847,832. PATENTED MAR. 19, 1907.
W. E. SCHNEIDER.
MACHINE FOR MAKING RECEPTACLES OF COMPRESSED PULP.
APPLICATION FILED JUNE 30, 1906.
11 SHEETS—SHEET 8.
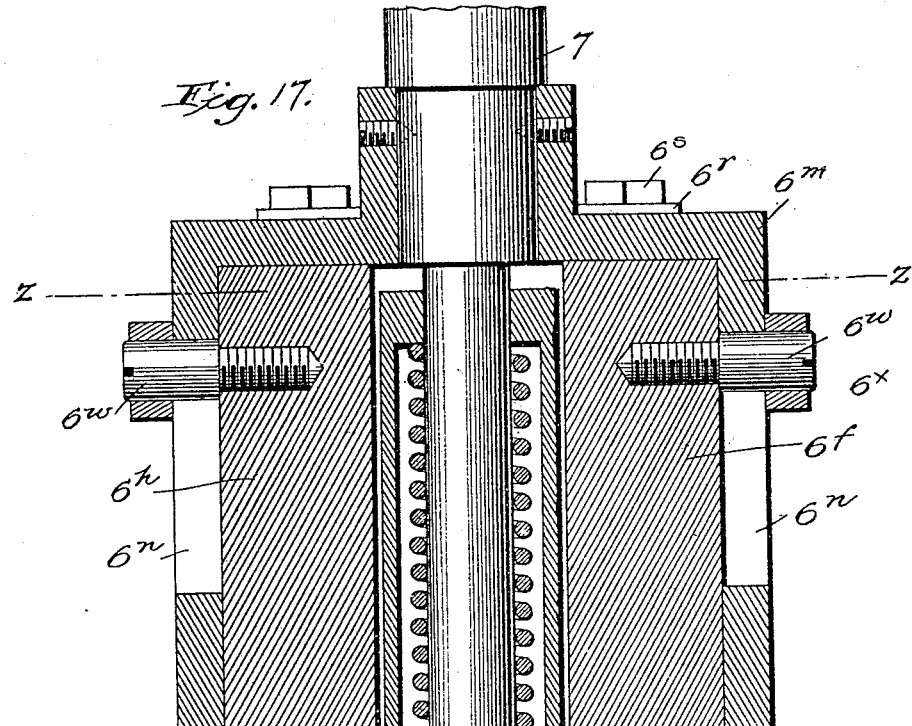

No. 847,832. PATENTED MAR. 19, 1907.
W. E. SCHNEIDER.
MACHINE FOR MAKING RECEPTACLES OF COMPRESSED PULP.
APPLICATION FILED JUNE 30, 1906.

11 SHEETS—SHEET 9.

No. 847,832. PATENTED MAR. 19, 1907.
W. E. SCHNEIDER.
MACHINE FOR MAKING RECEPTACLES OF COMPRESSED PULP.
APPLICATION FILED JUNE 30, 1906.
11 SHEETS—SHEET 10.
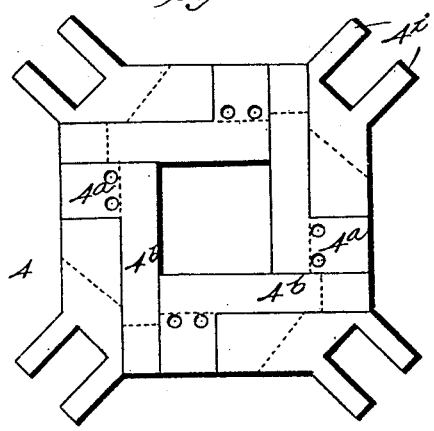
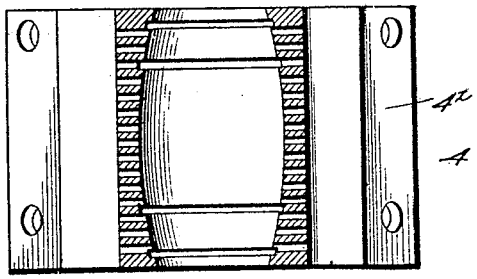
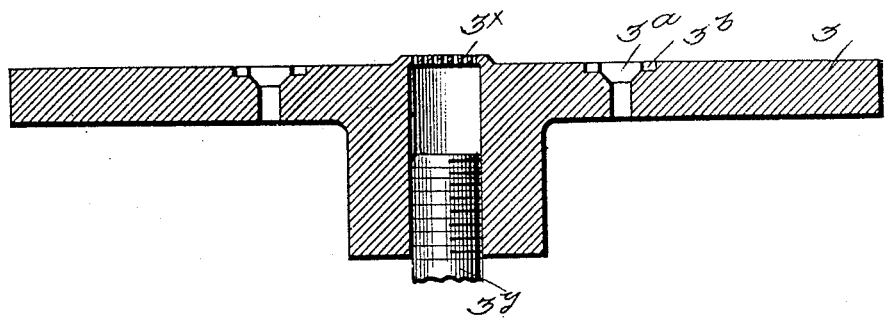
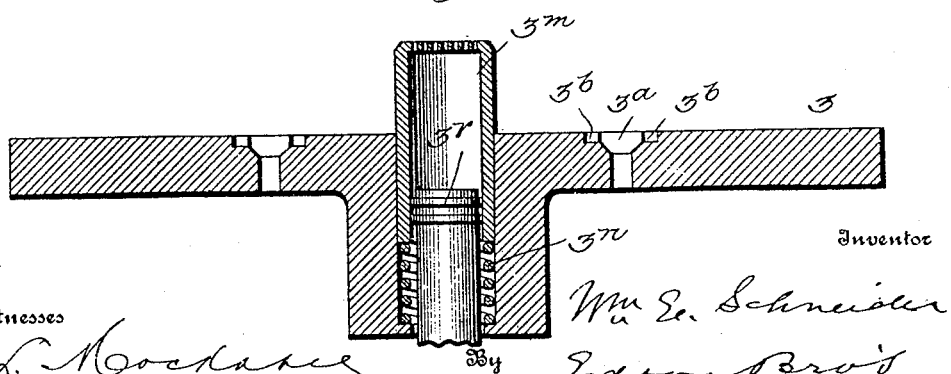

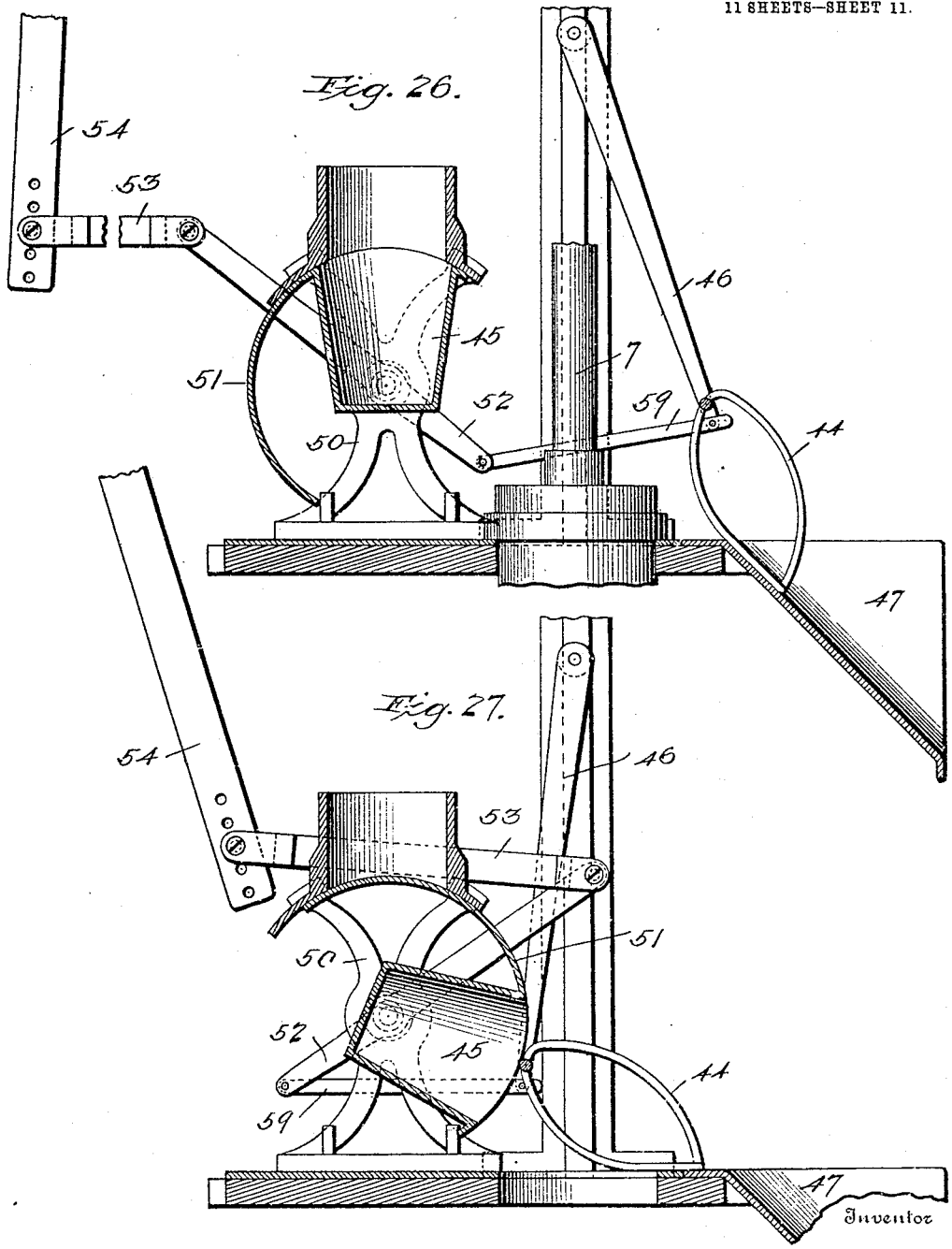

UNITED STATES PATENT OFFICE.

WILLIAM EDWIN SCHNEIDER, OF WASHINGTON, DISTRICT OF COLUMBIA.

MACHINE FOR MAKING RECEPTACLES OF COMPRESSED PULP.

No. 847,832.  Specification of Letters Patent.  Patented March 19, 1907.

Application filed June 30, 1906. Serial No. 324,212.

*To all whom it may concern:*

Be it known that I, WILLIAM EDWIN SCHNEIDER, a citizen of the United States, residing at Washington, in the District of Columbia, have invented certain new and useful Improvements in Machines for Making Receptacles of Compressed Pulp; and I do hereby declare the following to be a full, clear, and exact description of the invention, such as will enable others skilled in the art to which it appertains to make and use the same.

My invention relates to improvements in machines for making receptacles of compressed pulp.

It has for its objects, among others, to form a receptacle composed of integral side walls and bottom at one operation, which may be repeated with sufficient rapidity to make the cost of production very small, to make a receptacle of any desired shape as a result of the operation of the machine, and to produce a receptacle which will be very light, but at the same time extremely strong and rigid, so that it may be used for packing or storing and shipping of all kinds of merchandise.

The package or receptacle produced by my machine is especially fitted for holding milk and air-tight vegetables and fruits. Indeed, it may be employed in lieu of practically all forms of glass, paper, and metal receptacles.

The invention, broadly speaking, comprises a contractible mold to hold the pulp to be compressed into the desired shape, a mandrel adapted to enter said mold and to have a receptacle formed thereon and to be shrunk or collapsed to permit the receptacle when formed to be removed therefrom, and means to feed pulp to the mold in proper quantities to make each receptacle.

The invention further consists in the features of construction and combinations of parts hereinafter described, and more particularly pointed out in the claims concluding this specification.

Figure 2:
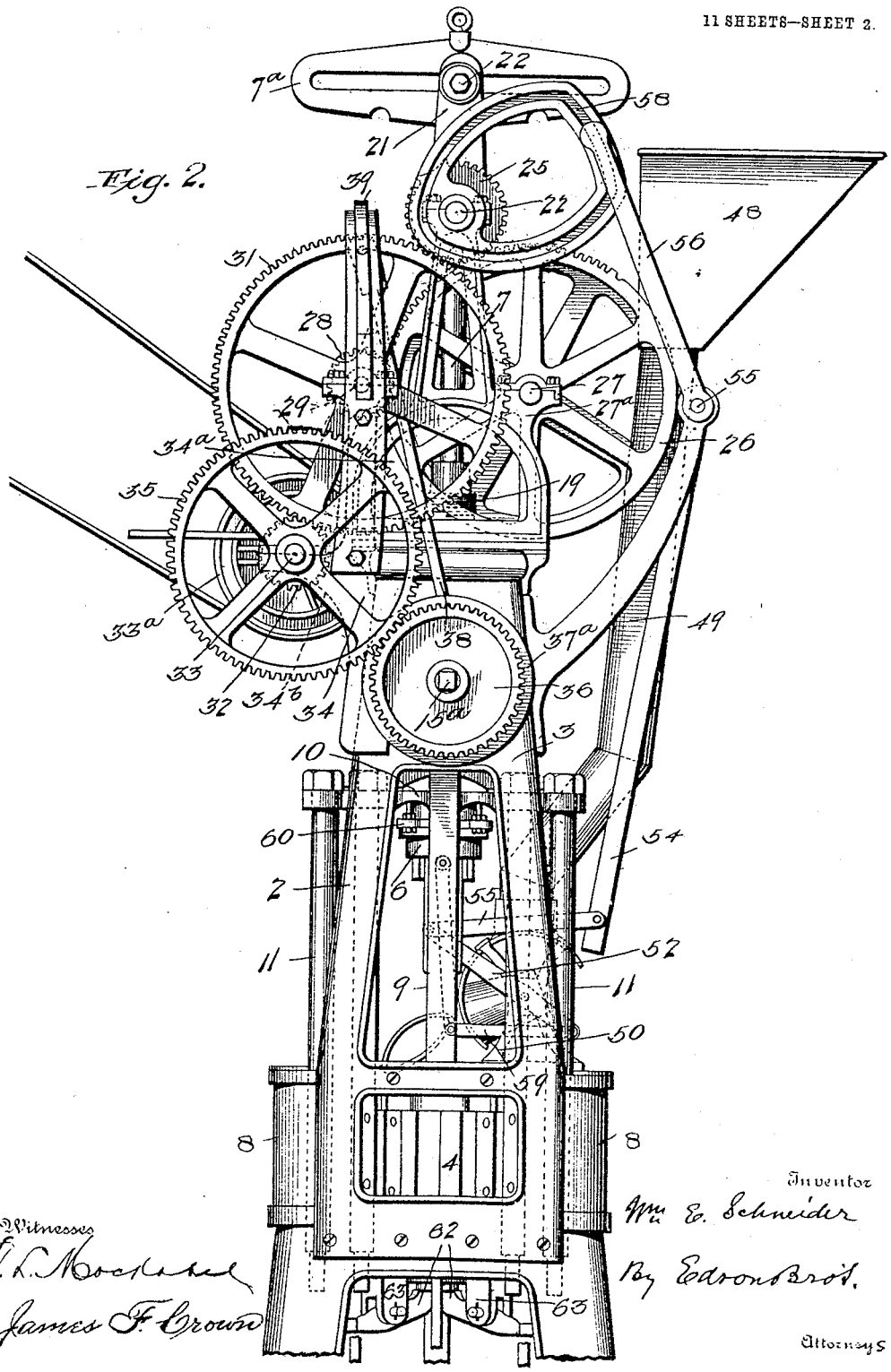
Figure 3:
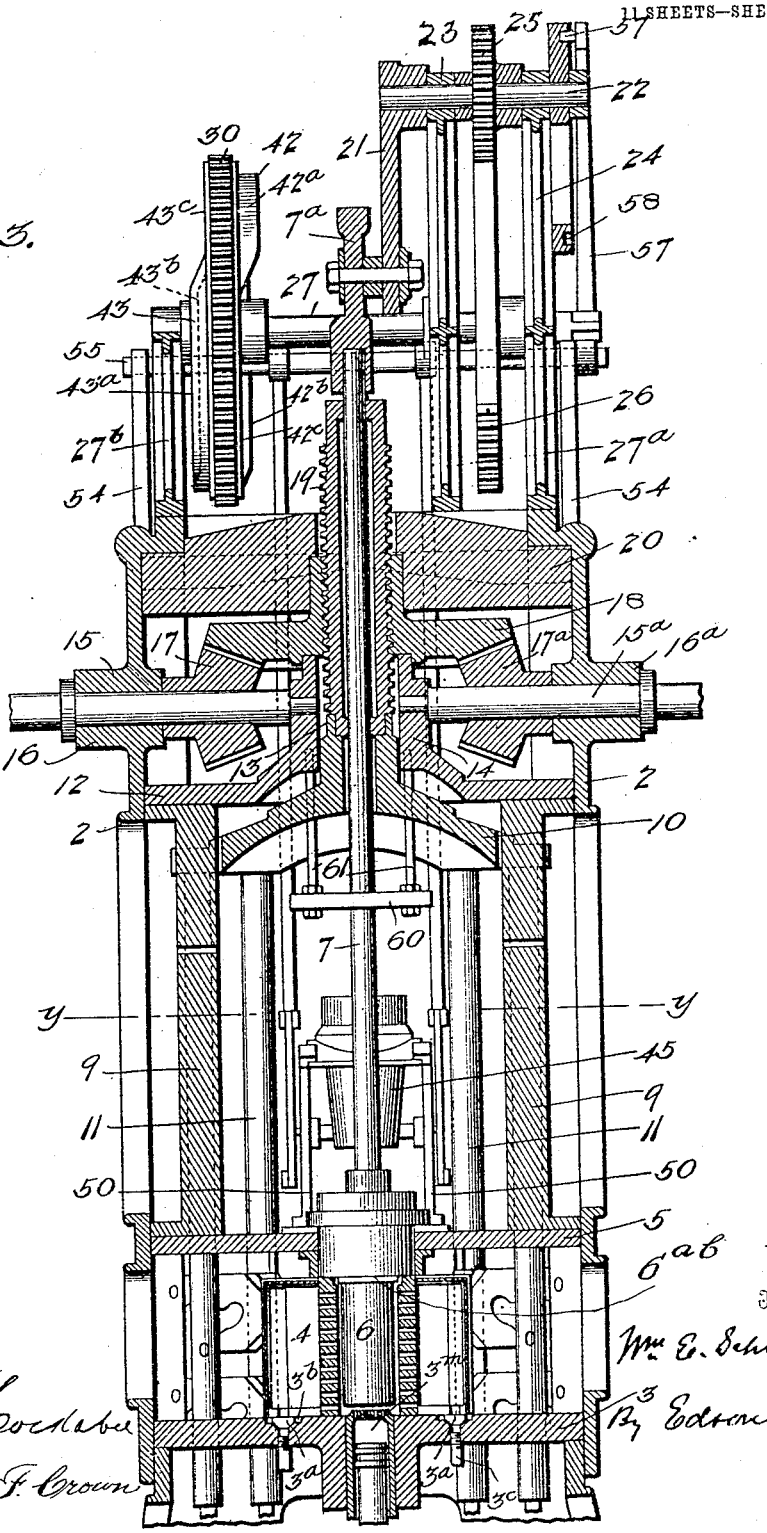
Figure 4:
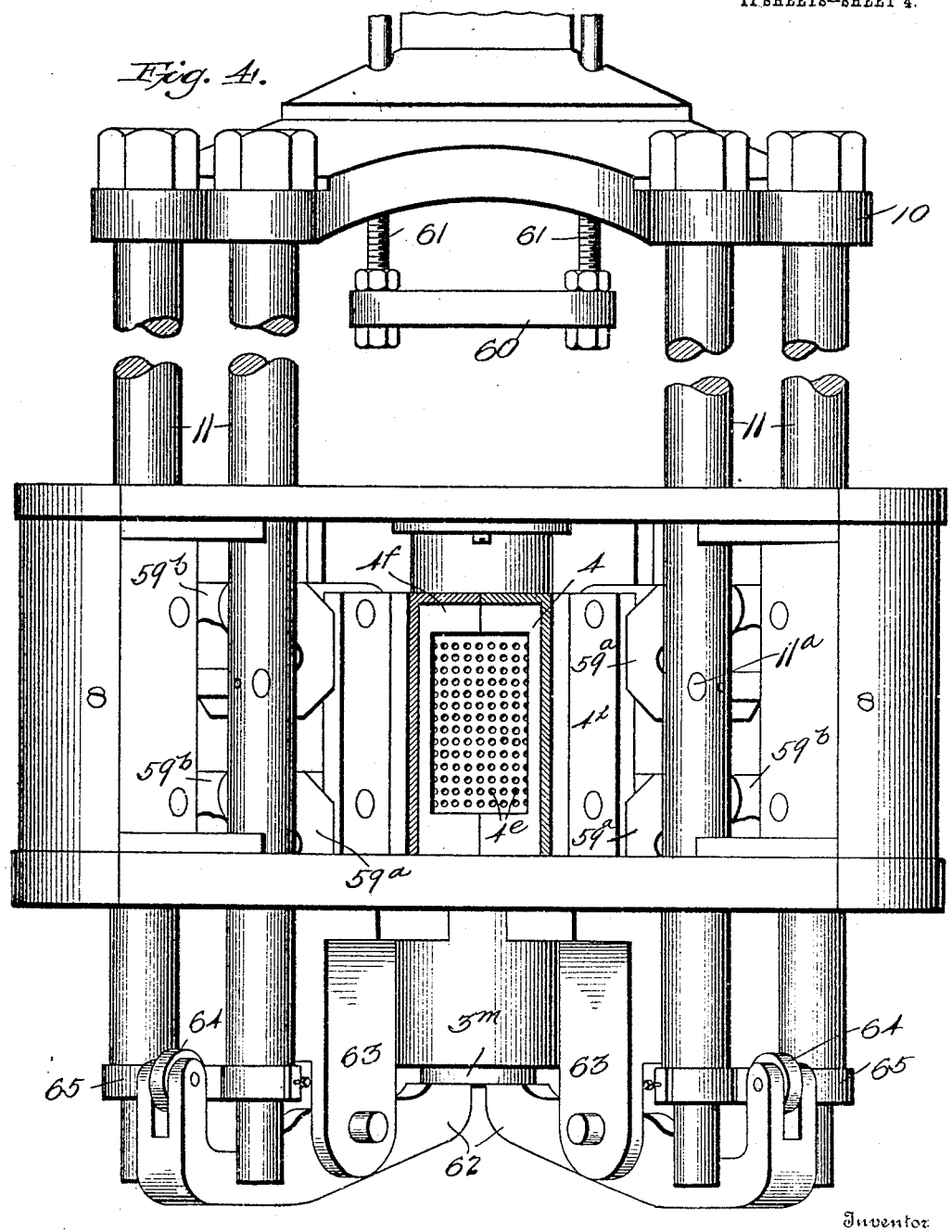
Figure 5:
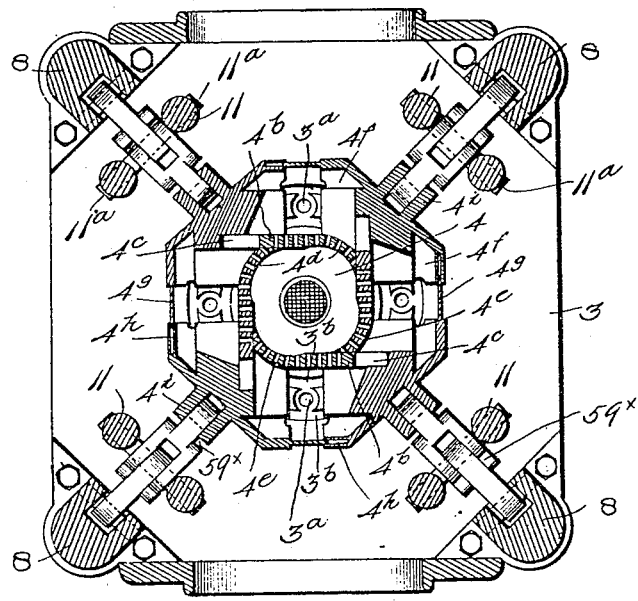
Figure 6:
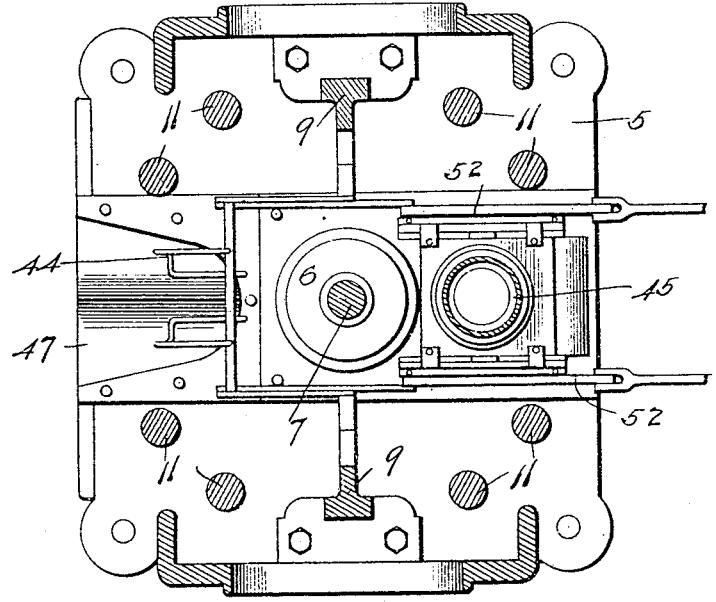
Figure 20:
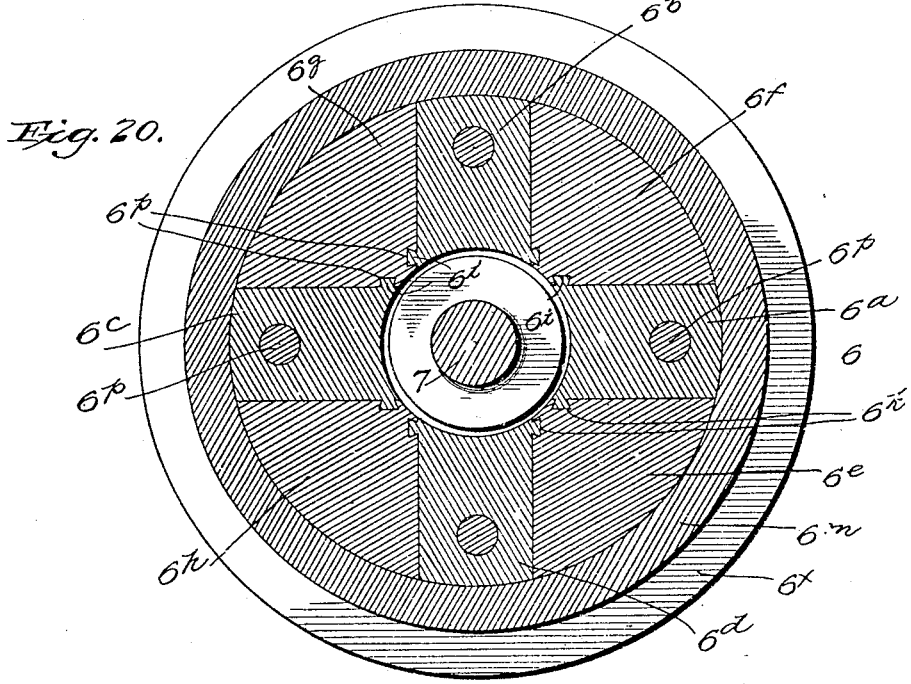
Figure 21:
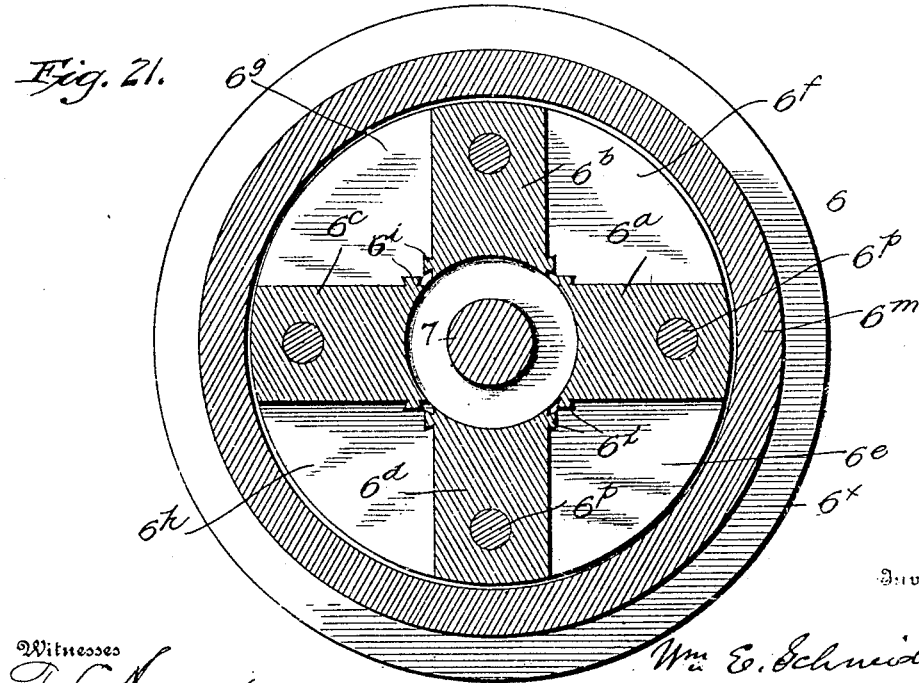

In the accompanying drawings, illustrating the preferred embodiment of my invention, Figure 1 is a front elevation of a machine constructed in accordance with my invention. Fig. 2 is a side elevation thereof, a part of the base being broken away. Fig. 3 is a central vertical sectional view of the machine, taken from side to side, parts at the bottom being broken away. Fig. 4 is a broken enlarged view of parts located near the mold and particularly illustrating the devices for opening and closing the jaws of the mold for forming the bottom of the receptacle. Fig. 5 is a horizontal sectional view taken through the jaws of the mold when open and before the mandrel has entered said mold. Fig. 6 is a horizontal sectional view taken on the line *y y* of Fig. 3, showing the chute and device for discharging the completed receptacles. Fig. 7 is a detailed plan view of the jaws of the mold open, said jaws being provided with vacuum-boxes for connection with the pump for drawing off the water pressed out of the pulp when the mold is contracted. Fig. 8 is a similar view of the jaws of the mold closed. Fig. 9 is a detailed elevation of the mold open as shown in Fig. 7, the walls of the front vacuum-box being broken away to disclose the perforations in the inner walls of the mold. Fig. 10 is a similar elevation of the mold closed as shown in Fig. 8. Fig. 11 is a detailed plan view of the members of one of the toggle-joints and the pin for connecting them. Fig. 12 is a side view of the same parts. Fig. 13 is a detailed side view of one of the jaws, one of the corner-posts of the frame, the toggles connecting them, and one of the rods carrying the pins for operating said toggles. Figs. 14 and 15 are detailed side and central sectional views, respectively, of the mandrel collapsed, the plunger-rod carrying said mandrel and the bottom plate of the mandrel being removed in the latter view. Fig. 16 is a top plan view of the cap of the mandrel, the end of one of the bolts for securing the wedge-sections of the mandrel to said cap being broken away to show one of the slots whereby said wedge-pieces are permitted to move inward when the mandrel is collapsed. Fig. 17 is an enlarged central sectional view of the mandrel, showing how it is mounted on the plunger-rod. Figs. 18 and 19 are detailed perspective views, respectively, of one of the wedge sections or pieces and one of the intermediate sections of the mandrel. Fig. 20 is a horizontal sectional view taken on the line *z z* of Fig. 17. Fig. 21 is a similar view showing the mandrel collapsed and the intermediate sections of the mandrel dropped down. Fig. 22 is a view of a modified form of mold for making a square receptacle. Fig. 23 is a central vertical sectional view of a modified form of mold for making a receptacle in the form of a barrel or keg. Fig. 24 is a detailed view of the plate upon which the jaws of the mold rest, showing a rigid piece for forming the bottom of the receptacle. Fig. 25 is a similar view showing a projecting tubular piece seated on a spring and adapted to be depressed when the plunger or mandrel descends, so that the bottom of the receptacle is formed by the pulp compressed between said plunger and depressed piece. Figs. 26 and 27 are broken detailed views of the devices for feeding the pulp to the mold and conveying off the completed receptacle.

Referring more particularly to the drawings, the working parts of the machine are mounted upon a suitable supporting-framework comprising, preferably, a base 1 and upwardly-extending side supports or frames 2, suitably secured to the upper portion of the base. Supported immediately upon said base is the bottom plate 3, which supports the mold 4. An upper plate 5 is arranged above said mold and is provided with a central opening for the entrance of the mandrel 6, mounted on the vertically-movable plunger-rod 7. Said upper plate is supported upon the bottom plate by corner-supports 8. Upon the top of the upper plate are mounted two upwardly-extending supports 9, one on each side, forming guides for the movement of the head-plate 10, from which depend rods 11 for operating the devices for opening and closing the mold. Said supports 9 also uphold a plate 12 with a central opening 13 and an upwardly-extending sleeve or collar 14, in the sides of which are bearings for the inner ends of oppositely-extending shafts 15 and 15$^a$, as seen particularly in Fig. 3. The main bearings 16 and 16$^a$ for said shafts 15 and 15$^a$ are in the side supports or frames 2. Each of the shafts, 15 and 15$^a$ carries a beveled pinion 17 and 17$^a$, respectively. Said pinions face each other and mesh with a horizontal beveled gear 18, mounted to revolve upon the upper end of the sleeve 14 on the plate 12. Said gear-wheel 18 is interiorly screw-threaded and engages a vertical hollow screw 19, connected to the head-plate 10 and secured against rotation. By this means the rotation of the gear-wheel 18 in one direction will cause said head-plate to descend, while the rotation of said gear in the opposite direction will cause said head-plate to rise. Above said gear and supported between the side supports 2 is arranged the top plate 20 of the framework.

The plunger-rod 7 extends up through the hollow screw and is connected, by means of a horizontally-slotted yoke 7$^a$, with a crank 21, carried by a shaft 22, mounted on brackets 23 and 24. Said shaft is revolved to turn the crank and raise and lower the plunger-rod carrying the mandrel by means of a gear 25 with interrupted teeth mounted on said shaft and meshing with another larger gear 26, also having interrupted teeth and mounted on another shaft 27, which always revolves when the machine is in operation. It will thus be seen that the plunger-rod, with the mandrel, will be raised and lowered at intervals and that at times between such intervals said rod will remain down with the mandrel in the mold while the mold is being closed to form the receptacle and opened again to permit of said receptacle being removed therefrom. Said shaft 27 is rotated by means of a small gear 28 on a shaft 29 meshing with a larger gear-wheel 30 on said shaft 27. The shaft 29 also carries a large gear 31, meshing with a small gear 32 on the main driving-shaft 33 of the machine. Said main shaft carries a driving clutch-pulley 33$^a$, and a hand-lever may be provided to throw said pulley into operation. The shaft 27 is mounted on brackets 27$^a$ and 27$^b$, the former being an arm of the bracket 24. The shafts 29 and 33 are mounted on arms 34$^a$ and 34$^b$, respectively, of brackets 34, one arranged on each side of the framework of the machine. The lower portions of said brackets are shown in dotted lines in Fig. 1 in order to better show the parts behind them. Gears 35 and 35$^a$ on the ends of the main driving-shaft 33 mesh with other gears 36 and 36$^a$, loosely mounted, respectively, on the shafts 15 and 15$^a$. Each of the gears 36 and 36$^a$ is adapted to be engaged by one of the clutches 37 or 37$^a$ to connect up said gears with their shafts 15 and 15$^a$ one at a time in order to revolve the gear-wheel 18 in first one direction and then in the other to raise and lower the head-plate 10, with the rods carried thereby, so as to close and open the mold. The operating-levers 38 and 38$^a$ for throwing the clutches 37 and 37$^a$ in and out are pivotally hung from arms 39 and 39$^a$ of the brackets 34. Said levers 38 and 38$^a$ are connected by a rod 40, extending across near the gear-wheel 30 and having lugs projecting therefrom carrying rollers 41 41$^a$, one arranged on either side of said gear-wheel 30. The sides of said gear-wheel 30 are provided with cam-surfaces 42 and 43, respectively, arranged near the periphery of said wheel. Each of said cams comprises three steps or widths, each extending one-third of the way around—namely, a wide portion 42$^a$ or 43$^a$, an intermediate portion 42$^b$ or 43$^b$, and a narrow portion 42$^c$ or 43$^c$. It will be understood that these portions or surfaces of the cams are arranged in inverse order on one side from what they are on the other, so that the narrow cam on the one side is opposite the wide cam on the other and the intermediate cams are opposite each other. It will thus be seen that during one-third of the revolution of the gear-wheel 30 the clutch will be thrown in, so as to cause the revolution of the shaft and pinion which lowers the head-plate 10 to close the mold, during the second third of the revolution of said gear the other shaft and pinion will be revolved to raise said head-plate and open the mold, and during the last third of the revolution of said gear—that is, when the rollers are traveling on the intermediate surfaces or portions of the cams—both clutches will be out and neither of the shafts 15 or 15ª will be revolved. It is during this last stage, when the head-plate is stationary, that the plunger-rod 7, carrying the mandrel, is raised and lowered by means of the crank 21 and gears with interrupted teeth in order to remove the receptacle just made from said mandrel and permit of the placing of material for making another receptacle in the mold.

The devices for feeding material to the mold and removing the completed receptacles are shown in detail in Figs. 26 and 27, the former showing their positions when the mandrel is inserted in the mold and a receptacle is being formed, while the latter shows their positions when the mandrel has been raised, the basket 44 having been brought into position to receive the completed receptacle as it is dropped from said mandrel and the measuring-cup 45 being tipped over in the act of pouring material into the mold. Said receiving-basket 44 is pivotally supported between swinging arms 46, hung from the side supports or guides 9, and has a forward-and-backward movement from a point over the opening of the mold to the chute 47 in the front casing of the machine. The material of which the receptacles are to be made is placed in a reservoir 48, preferably supported at the rear of the machine. Said material passes down through a pipe 49 to the measuring and feeding cup 45, which is pivotally mounted between brackets 50 and has a curved plate 51 extending rearwardly therefrom and adapted to close the opening of the pipe 49 when said cup is tilted or tipped forward. To prevent all leakage, the top of said cup and the bottom of said pipe, as well as the plate 51, are curved and form arcs of a circle having the axle upon which the cup turns as a center. The cup is rocked on its shaft by arms 52, secured to said shaft and connected at their upper ends by links 53 to long arms 54, extending upward and in turn secured to a rock-shaft 55, to which is also fastened a rock-arm 56, having a pin or lug 57 extending into the groove of a cam 58, mounted on the crank-shaft 22. The lower ends of the arms 52 are connected by links 59 to the arms 46, carrying the basket 44, whereby said basket and feeding-cup are operated by the same means.

The mold 4 comprises four interlocking jaw members 4ª, similarly constructed, each jaw having an extending tongue 4ᵇ engaging a groove 4ᶜ in the next adjacent jaw member. At the upper and lower extremities of the end of each of the tongues 4ᵇ are projecting lugs 4ˣ, (see Fig. 13,) extending into sockets 4ʸ (see Fig. 7) in the adjacent jaw member. The object in providing said lugs is to retain the jaws always in horizontal alinement as they are moved in and out to close and open the mold. The inner surface of each jaw, near the base of its tongue, is cut into on a curved line, as at 4ᵈ, Figs. 7 and 8, so that the interior of said mold when closed will be circular. The circular form of the receptacle is, however, only one of a variety of shapes in which said receptacles may be made. In Fig. 22 I have illustrated a mold for making square receptacles, while in Fig. 23 is shown a mold for making receptacles the shape of barrels or kegs. Other shapes may be made by simply changing the form of the interior of the mold without modifying the operation of the machine. The jaw members are so fitted together that they must all be moved simultaneously and at the same speed to move them at all to open or close the mold. The jaws are perforated, as at 4ᵉ, to permit the water pressed from the compressed pulp to pass outward into vaccum boxes or chambers 4ᶠ, formed between each jaw and the adjacent jaws. Said vacuum chambers or boxes are kept closed and air-tight when said jaws are opened by tongues 4ᵍ, extending up the sides and across the tops of said boxes and entering correspondingly-arranged grooves or ways 4ʰ. One of said tongues 4ᵍ is carried by the portion of a box at one side of each jaw, while the portion of the box at the other side of said jaw is provided with one of the grooves 4ʰ. The bottoms of said vacuum boxes or chambers open directly upon the bottom plate 3 of the machine. Each vacuum-box is arranged over a funnel-shaped or countersunk opening 3ª in said plate, said openings being preferably connected by grooves 3ᵇ, so as to carry off all escaped water. Fitted in said openings from below are pipes 3ᶜ, leading to an air-tight receptacle 3ᵈ, connected by pipes 3ᵉ to a vacuum-pump 3ᶠ, mounted and suitably secured to the frame. Said pump is preferably operated by an eccentric 3ᵍ, carried by the piston-rod 3ʰ and mounted on the main driving-shaft 33 of the machine. The object in providing the vacuum-boxes on the mold, the pump, and their connections is to create a vacuum or suction in said boxes which will draw the water therefrom as a receptacle is being formed in the mold and prevent any of the water from being drawn back upon the surface of the completed receptacle by reason of the vacuum created in the mold as it is being opened to permit of the removal of said receptacle. Said jaws are moved inward and outward to open and close the mold by the operation of toggle-joints 59ˣ, each comprising two members 59ª and 59ᵇ, one member connected between ears 4ⁱ on each jaw and the other member connected to one of the corner-supports 8. The inner member 59ª of each toggle is provided with a downwardly-extending shoulder having a finger $59^c$ arranged parallel with the longitudinal axis of said member, with a slot $59^d$ between said finger and the body of said member, into which fits a cross-pin $11^a$, carried by the operating-rods 11, which are arranged in pairs, one at each corner of the machine. The finger is of such length that when the toggle-joint is extended so as to close the mold the cross-pin will escape the same, permitting the operating-rods to pass farther downward. Two toggles similarly constructed are preferably provided for operating each jaw of the mold. The effect of the operation of the rods 11 on their upward stroke is to withdraw the jaws by means of the cross-pins $11^a$ coming in contact with and folding the toggles, while on the downward stroke of said rods the cross-pins engaging with the fingers $59^c$ will extend said toggles and advance said jaws to close the mold.

The mandrel 6 comprises four wedge-sections $6^a$, $6^b$, $6^c$, and $6^d$ and four intermediate sections $6^e$, $6^f$, $6^g$, and $6^h$, having longitudinally-sliding dovetail connection with one another, the wedge-sections having the tongues $6^i$ and the intermediate sections the grooves $6^k$. The wedge-sections taper downwardly, while the intermediate sections taper upwardly to a corresponding degree. The upper portions of both kinds of sections are fitted within a cap $6^m$, which is secured to the plunger-rod 7. Said upper portions of said sections, which form the upper end of the mandrel, are enlarged, forming a shoulder $6^{ab}$, adapted to close the top of the mold when the mandrel is inserted therein, as shown in Fig. 3, whereby the material is prevented from splashing out when the jaws of the mold are contracted. The upper horizontal surface of said cap is provided with radial slots $6^n$, through which project bolts $6^p$, fastened to the upper ends of the wedge-sections. Said bolts are fitted with washers $6^r$ and nuts $6^s$, whereby said wedge-sections are always retained in the same relation with said cap horizontally, but are permitted to change their positions vertically with relation to said cap, because said bolts may move inward and outward in said slots as the mandrel is shrunk and expanded. The cap is also provided with longitudinal slots $6^u$, through which project bolts $6^w$, the heads of which secure a ring $6^x$, extending around the cap. On the upward stroke of the plunger-rod said ring contacts with a circular frame 60, (see Fig. 3,) supported by long bolts or rods 61 from the plate 12, said rods or bolts passing through suitable passages provided therefor in the head-plate 10. When said ring comes in contact with said frame 60, it will be arrested, together with the intermediate sections of the mandrel, while the wedge-sections of said mandrel will be carried farther upward, because of their connection with the top of the cap. The result of this operation will be to collapse or shrink the mandrel, and the purpose thereof is to release the receptacles after they have been formed in the mold and raised therefrom upon said mandrel. The interior of the mandrel is hollow, and into it extends the end of the plunger-rod 7, which is fitted at its extremity with a nut $7^x$. The lower end of the mandrel is closed by the bottom piece $6^y$, which is secured to (preferably screwed into) the lower end of a tube $6^z$, fitting within the mandrel and around the end of the plunger-rod. The upper end of said tube fits closely around said rod, forming a bearing for one end of a coiled spring $7^y$, the other end of which abuts against the nut $7^x$. It will be seen that the collapsing of the mandrel will compress said spring, because the tube $6^z$ is secured to the bottom piece of the mandrel, and said bottom piece will be arrested by the intermediate sections, while the wedge-sections and the plunger-rod carrying the nut $7^x$ move farther upward. It will also be seen that as said spring is compressed by the collapsing of the mandrel it will draw the sections of the mandrel together, thereby causing said mandrel to expand as soon as the plunger-rod passes down far enough to remove the ring $6^x$ from contact with the circular frame 60.

I have shown three devices for forming the bottom of the receptacles. The simplest way is to perforate a portion of the bottom plate 3, as shown at $3^x$ in Fig. 24, and form a socket below said perforated portion, into which the end of a pipe $3^y$, communicating with the air-tight receptacle $3^d$, is fitted, so that the water will be drawn off from the bottom by the pump $3^f$, as well as from the sides, through the vacuum-boxes on the jaws of the mold. The bottom-forming device shown in Fig. 25 comprises an inverted cylindric member $3^m$, which is seated upon a coiled spring $3^n$ and is normally held thereby above the surface of the bottom plate 3, but adapted to be depressed by the mandrel as it descends. The pipe $3^y$, leading to the receptacle 3, in this case is provided with packing-rings $3^r$, so as to prevent leakage as the member $3^m$ moves upon said pipe. The third device, forming the bottoms of the receptacles, is illustrated in Figs. 1, 2, 3, and 4. It comprises the same form of inverted cylindric member $3^m$, arranged upon the end of the pipe $3^y$ in the same manner as before described in connection with the showing in Fig. 25. In this case, however, instead of being seated upon a spring which supports it above the surface of the bottom plate 3 the member $3^m$ normally stands below the surface of said plate and is supported by levers 62, pivotally mounted on brackets 63, depending from said plate. The outer ends of said levers preferably carry rollers 64 and are depressed to raise their inner ends and bring the member 3ᵐ to a level with the bottom plate by double collars 65, one of which is mounted between each pair of the rods 11 and is arranged in the path of the roller on one of the levers 62. By this arrangement of devices the jaws of the mold will be closed and the bottom-forming device raised at substantially the same time on the downward stroke of the rods 11. The last-described bottom-forming device should be used when it is desired to have a good deal of material in the bottoms of the receptacles. The device shown in Fig. 24 should be used when less material is desired in the bottoms of the receptacles, and the device shown in Fig. 25 is to be employed when still less material is wanted in said bottoms. It will therefore be seen that the thickness and density of the bottoms of the receptacles may be regulated to suit any requirements.

The operation of the machine to make a receptacle and discharge it is as follows: If the operation is commenced with the parts in the positions shown in Fig. 2, the first devices to move would be the feeding and measuring cup 45 and the basket 44, the former of which will be turned back below the pipe 49 to receive another measure of material and the latter moved forward into the chute 47 to discharge the receptacle just completed and released from the mandrel. These operations of the cup and basket result from the movement of the rock-arm 56, controlled by the cam 58, and the transmission of this movement through the shaft 55, arms 54, links 53, arms 52, and links 59, the movement of the basket being further controlled by the arms 46. The plunger-rod carrying the mandrel then begins to descend, said rod being operated by the crank 21, which is revolved by the gear 25, meshing with the teeth on the gear 26. As said mandrel moves downward the ring 6ˣ is released from contact with the circular frame 60 and the spring arranged in said mandrel expands the latter. Continuing downward, the mandrel enters the mold and as it does so compresses some of the material at the bottom thereof and raises the level of said material around the sides of said mold. When the mandrel is in place in the mold, the gear 26, having turned until the end of the toothed portion thereof has been reached, said gear ceases to revolve the gear 25, while the smooth portion thereof is passing below said latter gear, so that the plunger-rod and mandrel will remain stationary for a time. While the foregoing operations are taking place the rollers 41 41ᵃ of the apparatus for controlling the clutches 37 37ᵃ, which cause the rotation of the shafts 15 15ᵃ, are traveling along the intermediate portions 42ᵇ 43ᵇ of the cams 42 43. When the mandrel has reached its lowest position, the gear-wheel 30, carrying the cams 42 43, has revolved so that the rollers 41 41ᵃ are shifted from the intermediate surfaces of the cams to the wide portion on one side of said ar-wheel and the narrow portion on the other side. In so shifting the rollers, which are attached to the rod 40, said rod is moved longitudinally and by means of the levers 38 38ᵃ throw in one of the clutches 37 37ᵃ, thereby revolving one of the shafts 15 15ᵃ and causing the head-plate 10 and rods 11 to descend through the instrumentality of one of the pinions 17 17ᵃ, the beveled gear 18, and the screw 19. The descent of said rods 11, which carry the cross-pins 11ᵃ, extends the toggles 59 by said cross-pins engaging the fingers 59ᶜ, as previously described, and thereby closes the jaws of the mold. This causes the material around the mandrel to rise to the top of the mold and then compresses said material, thereby forming the sides of the receptacle. It will be understood that the upper portion the mandrel closes the top of the mold and prevents the material from escaping at that point. If the bottom-forming device shown in Fig. 25 is used, the descent of the mandrel will depress the member 3ᵐ and there complete the compression of the material caught between said mandrel and member 3ᵐ when the latter has reached its lowest point before the jaws of the mold are closed. Likewise when the bottom-forming device shown in Fig. 24 is employed the bottom of the receptacle is formed before the sides by the bottom of the mandrel compressing some of the material upon the perforated portion 3ˣ. When, however, the other described means for forming the bottom of the receptacle is employed, said bottom is formed subsequently to the forming of the sides by the member 3ᵐ being raised from below the surface of the bottom plate by means of the levers 62, operated by the double collars 64, carried by the rods 11 during the final downward movement of said rods. By the time these operations have taken place the gear-wheel 30, carrying the cams 42 43, has turned so that the rollers 41 41ᵃ are again shifted to engage, respectively, the narrow portion of the cam on the side where previously it had engaged the wide portion thereof, and vice versa. This shifting of the rollers moves the rod 40 and the levers 38 38ᵃ so as to throw out that one of the clutches 37 37ᵃ heretofore engaged and throw in the other one of said clutches, thereby stopping the revolution of that one of the shafts 15 15ᵃ previously actuated and rotating the other one of said shafts. This causes the gear 18 to be reversed and to revolve in the opposite direction and raises the head-plate 10 and rods 11. The raising of said rods first releases the levers 62, if the bottom-forming device embodying said levers is in use, then opens the jaws of the mold by means of the cross-pins engaging and folding the toggles 59. At the end of the upward stroke of the head-plate the rollers 41 41ª have again passed onto the intermediate surfaces of the cams 42 43 on the gear-wheel 30, so that both of the clutches 37 37ª are thrown out and the head-plate remains up, while the plunger-rod and mandrel are raised by the crank 21, the shaft upon which said crank is mounted being then rotated by reason of the smooth portion of the periphery of the gear 26 having passed and its teeth again meshing with the teeth of the gear 25. When the plunger-rod carrying the mandrel has made most of its upward stroke, the feeding-cup 45 will be rocked forward to pour another measure of material into the mold and the basket 44 will be brought over the opening to the mold by means of the cam 58, rock-arm, and shaft and their connecting levers and links, as previously described. As the basket 44 reaches a position below the mandrel the final movement of the plunger-rod on its upward stroke will bring the ring 6ˣ in contact with the frame 60, collapsing the mandrel and dropping the completed receptacle therefrom upon said basket, from which it is discharged by way of the chute 47. Continued action of the machine repeats the operations of the parts in the order as just described.

I claim—

1. A machine of the character described having a mold, and a shrinkable sectional mandrel adapted to be bodily lowered into and raised from said mold.

2. A machine of the character described having a contractible mold, and a shrinkable mandrel adapted to be bodily lowered into and raised from said mold.

3. A machine of the character described having a mold, and a shrinkable sectional mandrel adapted to be automatically lowered into and raised from said mold and shrunk when raised to release the receptacle.

4. A machine of the character described having a contractible mold and a shrinkable mandrel adapted to be automatically lowered into and raised from said mold and shrunk when raised to release the receptacle.

5. A machine of the character described having a mold, a shrinkable mandrel adapted to be automatically lowered into and raised from said mold and shrunk when raised to release the receptacle, and means to remove the completed receptacle.

6. A machine of the character described having a contractible mold, a shrinkable mandrel adapted to be automatically lowered into and raised from said mold and shrunk when raised to release the receptacle, and means to remove the completed receptacle.

7. A machine of the character described having a mold, means to feed material to said mold, a shrinkable mandrel adapted to be automatically lowered into and raised from said mold and shrunk when raised to release the receptacle, and means to remove the completed receptacle.

8. A machine of the character described having a contractible mold, means to feed material to said mold, a shrinkable mandrel adapted to be automatically lowered into and raised from said mold and shrunk when raised to release the receptacle, and means to remove the completed receptacle.

9. A machine of the character described having a mold, a shrinkable mandrel adapted to be automatically lowered into and raised from said mold and shrunk when raised to release the receptacle, and means to feed material to said mold in predetermined quantities.

10. A machine of the character described having a mold, a mandrel, a movable measuring-cup, and means to automatically actuate said cup to feed material to said mold.

11. A machine of the character described having a mold, a mandrel, a pipe leading from a source of supply of material for making receptacles, a movable measuring-cup mounted below the outlet of said pipe, means to automatically operate said cup to feed material to said mold, and means to close the opening at the outlet of said pipe while the cup is feeding the material contained therein to the mold.

12. A machine of the character described, having a mold, a mandrel, a pipe leading from a source of supply of material for making receptacles, a measuring-cup pivotally mounted below the outlet of said pipe, said cup having a plate extending therefrom adapted to close the outlet of said pipe while the cup is feeding the material contained therein to the mold.

13. A machine of the character described, having a mold, a mandrel, a pipe leading from a source of supply of material for making receptacles, a measuring-cup pivotally mounted below the outlet of said pipe, said cup having a plate extending therefrom, for the purpose specified, the upper edge of said cup, the outlet of said pipe, and the plate extending from said cup all forming arcs of the same circle having its center at the pivotal axis of said cup.

14. A machine of the character described having a mold, a mandrel, a pipe leading from a source of supply of material for making receptacles, a measuring-cup pivotally mounted below the outlet of said pipe, and cam-and-lever mechanism to turn said cup at proper intervals to feed material to the mold.

15. A machine of the character described having a mold, a mandrel, adapted to be raised out of the mold, means to collapse said mandrel, when raised, to release the completed receptacle and means to receive said receptacle and discharge it when released.

16. A machine of the character described having a mold, a mandrel adapted to be raised from said mold, means to collapse said mandrel, when raised, to release the completed receptacle, a basket mounted on pivoted arms, and means to swing said basket on said arms to a position below the mandrel and out from below said mandrel for the purposes described.

17. A machine of the character described having a mold, a mandrel adapted to be raised from said mold, means to collapse said mandrel, when raised, to release the completed receptacle, means to carry off the completed receptacle and means to feed material in predetermined quantities to said mold.

18. A machine of the character described, having a mold, a mandrel adapted to be raised from said mold, means to collapse said mandrel, when raised, to release the completed receptacle, means to carry off the completed receptacle, means to feed material in predetermined quantities to said mold, and common means to actuate the devices for carrying off the completed receptacle and feeding material to the mold.

19. A machine of the character described having a mold, a mandrel adapted to be raised from said mold, means to collapse said mandrel, when raised, to release the completed receptacle, a swinging basket for carrying off the completed receptacle, a pivoted feeding-cup, an arm secured to said cup, a link connecting said arm and basket, and means to oscillate said arm whereby said cup and basket are both actuated.

20. In a machine of the character described, the combination, with a contractible mold, of a shrinkable mandrel adapted to be inserted into said mold, said mandrel having an enlargement at its end forming a shoulder adapted to close the top of the mold when said mandrel is inserted therein.

21. In a machine of the character described, a collapsible mandrel comprising wedge-sections and intermediate sections having sliding connection with one another, and a cap fitting over the ends of said sections.

22. In a machine of the character described, a collapsible mandrel comprising wedge-sections, and intermediate sections having sliding dovetail connection with one another, and a cap fitting over the ends of said sections.

23. In a machine of the character described, a collapsible mandrel comprising wedge-sections and intermediate sections and a cap fitting over the ends of said sections the intermediate sections having vertical and horizontal movement with relation to said cap but said wedge-sections restricted to a horizontal movement therewith.

24. A machine of the character described having a mold, a collapsible mandrel comprising wedge-sections and intermediate sections, a cap fitting over the ends of said sections, a plunger-rod secured to said cap, and means to reciprocate said rod to insert the mandrel into the mold and remove it therefrom.

25. A machine of the character described having a mold, a collapsible mandrel comprising wedge-sections and intermediate sections having sliding interlocking connection with one another, a cap fitting over the ends of said sections, and means to reciprocate said rod to insert the mandrel into the mold and remove it therefrom.

26. A machine of the character described having a mold, a collapsible mandrel comprising wedge-sections and intermediate sections having sliding interlocking connection with one another, a cap fitting over the ends of said sections and connected thereto whereby the intermediate sections have vertical and horizontal movement with relation to said cap while the wedge-sections are restricted to a horizontal movement with relation thereto, and means to reciprocate said rod to insert the mandrel into the mold and remove it therefrom.

27. A machine of the character described having a mold, a plunger-rod, a collapsible mandrel secured to said rod, means to reciprocate said rod to insert said mandrel into the mold, and remove it therefrom, means to collapse the mandrel when it is removed from the mold and means to expand said mandrel before it enters the mold again.

28. A machine of the character described having a mold, a plunger-rod, a collapsible mandrel secured to said rod, means to reciprocate said rod to insert the mandrel into the mold and withdraw it therefrom, a spring arranged within the mandrel and normally holding it expanded, and means to collapse said mandrel against the energy of said spring.

29. A machine of the character described having a mold, a plunger-rod, a sectional mandrel mounted on said rod, means to reciprocate said rod to insert said mandrel into the mold and remove it therefrom, a ring arranged around the outside of said mandrel and attached to some of the sections thereof, a spring within the mandrel and normally holding it expanded, and a fixture adapted to engage said ring and collapse the mandrel against the energy of said spring.

30. A machine of the character described having a mold, a plunger-rod, a mandrel mounted on said rod and comprising wedge-sections and intermediate sections, means to reciprocate said rod to insert said mandrel into the mold and remove it therefrom, a ring arranged around the outside of said mandrel and attached to the intermediate sections thereof, a spring within the mandrel and normally holding it expanded, means to hold the wedge-sections of the mandrel always in the same relation horizontally with the plunger-rod, and a fixture adapted to engage said ring and collapse the mandrel against the energy of said spring.

31. A machine of the character described having a plunger-rod, a mandrel comprising wedge-sections and intermediate sections, a cap fitting over the ends of said sections and secured to said rod, said cap having radial slots in its horizontal portion and vertical slots in its vertical portion, headed bolts secured to the wedge-sections and extending through said radial slots, unheaded bolts secured to the intermediate sections and extending through said vertical slots, a ring around said cap and connected to the projecting portions of said unheaded bolts, a spring within said mandrel normally holding it expanded and a fixture adapted to engage said ring and collapse the mandrel against the energy of said spring.

32. A machine of the character described having a plunger-rod, a mandrel secured to said rod and comprising wedge-sections and intermediate sections, a portion of said rod extending into the mandrel, a spring arranged around the portion of said rod within the mandrel, means to retain the wedge-sections of the mandrel always in the same horizontal relation with the plunger-rod, means to move the wedge-sections vertically with relation to the intermediate sections to collapse the mandrel, and connections between said intermediate sections and the spring and between said spring and the plunger-rod whereby the collapsing of the mandrel will compress said spring.

33. A machine of the character described having a plunger-rod, a mandrel secured to said rod and comprising wedge-sections and intermediate sections, a portion of said rod extending into the mandrel, a nut on the end of said portion of said rod, a spring arranged around said rod and abutting at one end against said nut, means to retain the wedge-sections of the mandrel always in the same relation with the plunger-rod, means to move the wedge-sections vertically with relation to the intermediate sections to collapse the mandrel, a bottom piece arranged below the ends of the sections of the mandrel, and a tube secured to said bottom piece and extending over and forming a bearing for the other end of said spring.

34. A machine of the character described having a contractible mold comprising a plurality of interlocking jaw members and a shrinkable mandrel adapted to be bodily lowered into and raised from said mold.

35. A machine of the character described having a contractible mold comprising a plurality of interlocking jaw members, means to move said jaw members to open and close the mold, a collapsible mandrel adapted to be inserted into said mold and means to compress the material in the bottom of the mold from below.

36. A machine of the character described having a contractible mold comprising a plurality of interlocking jaw members, means to move said jaw members to open and close the mold, a collapsible mandrel adapted to be inserted into said mold, a vertically-movable piece arranged in the bottom of said mold, and means to move said piece to form the bottom of the receptacle.

37. A machine of the character described having a contractible mold comprising a plurality of interlocking jaw members, means to move said members to open and close the mold, a collapsible mandrel adapted to be inserted into said mold, a vertically-movable piece arranged in the bottom of the mold and normally arranged below the level thereof, and means to raise said piece to form the bottom of the receptacle.

38. A machine of the character described having a contractible mold comprising a plurality of interlocking jaw members, toggle-joints, one arranged between each of said jaw members and a fixture, a collapsible mandrel adapted to be inserted into said mold, a vertically-movable piece arranged in the bottom of the mold and normally arranged below the level thereof, levers supporting said piece, and vertically-movable rods having means to operate said toggles and said levers.

39. A machine of the character described having a contractible mold comprising a plurality of interlocking jaw members, toggle-joints, one arranged between each of said jaw members and a fixture, each toggle having one member provided with a laterally-offset finger extending in a line with the longitudinal axis of said member, a mandrel adapted to be inserted into said mold, a vertically-movable piece arranged in the bottom of the mold for forming the bottom of the receptacle, and vertically-movable rods having pins adapted to engage the fingers of the toggles to operate the same.

40. A machine of the character described having a contractible mold comprising a plurality of interlocking jaw members, toggle-joints, one arranged between each of said jaw members and a fixture, each toggle having one member provided with a laterally-offset finger extending in a line with the longitudinal axis of said member, a mandrel adapted to be inserted into said mold, a vertically-movable piece arranged in the bottom of the mold and normally standing below the level thereof, levers supporting said piece, and vertically-movable rods having pins adapted to engage the fingers of the toggles to operate the same, said rods also having means to engage the levers to raise the piece in the bottom of the mold.

41. A machine of the character described having a contractible mold comprising a plurality of jaw members, means to move said members to open and close the mold, a mandrel adapted to be inserted into the mold, a vertically-movable piece arranged in the bottom of the mold, levers supporting said piece and having rollers on their outer ends, and vertically-movable rods having collars adapted to engage said rollers.

42. A machine of the character described having a contractible mold comprising a plurality of jaw members, each jaw member having a straight tongue extending therefrom and engaging a groove in the adjacent member, the surfaces of said tongues which form the interior of the mold being arranged at right angles to each other and adapted to open and close upon one another.

43. A machine of the character described having a contractible mold comprising a plurality of jaw members, said members having chambers therein communicating with the interior of said mold, and means to carry off the water from said chambers as the material is compressed in the mold.

44. A machine of the character described having a contractible mold comprising a plurality of jaw members, said members having chambers therein communicating with the interior of the mold, and means to create a vacuum in said chambers to draw off the water as the material is compressed in the mold.

45. A machine of the character described having a contractible mold comprising a plurality of interlocking jaw members, said jaw members having chambers therein, one between each adjacent pair thereof, the inner walls of said members having perforations leading to said chambers and means to create a vacuum in said chambers and draw off the water pressed from the material as a receptacle is formed.

46. A machine of the character described having a contractible mold comprising a plurality of jaw members, said members having chambers therein, one between each adjacent pair thereof, the inner walls of said members having perforations leading to said chambers, a plate arranged below said members and having openings therein arranged below said chambers, pipes connected to said openings, and means to create a vacuum in said chambers and draw off the water pressed from the material through said pipes.

47. A machine of the character described having a contractible mold comprising a plurality of jaw members, said members having chambers therein, one between each adjacent pair thereof, the inner walls of said members having perforations leading to said chambers, a plate arranged below said member and having countersunk openings therein connected by grooves, said openings being located below said chambers, pipes fitted in said openings, and means to create a vacuum in said chambers and draw off the water pressed from the material through said pipes.

48. A machine of the character described having a contractible mold comprising a plurality of jaw members, said members having chambers therein, said members having perforations leading to said chambers, a plate arranged below said members and having openings therein arranged below said chambers, an air-tight box arranged below said plate, pipes connecting said box with the openings in said plate and a pump connected up with said box for the purpose specified.

49. A machine of the character described having a contractible mold comprising a plurality of jaw members, each member having an extending tongue engaging a groove in the adjacent member, said members having chambers arranged between them, the inner walls of said members having perforations leading to said chambers which are closed at the sides and top by other tongues engaging other grooves and arranged parallel to the first-mentioned tongues, and means to draw water from the mold through said chambers.

50. A machine of the character described having a contractible mold comprising four jaw members, each member having two extending tongues, arranged parallel to each other, one on the inner surface of said mold and the other at the outer surface thereof, said members having chambers arranged between said inner and outer tongues and communicating with the interior of said mold, and means to draw water from the mold through said chambers.

51. A machine of the character described having a contractible mold comprising four jaw members, each member having two extending tongues arranged parallel to each other, one on the inner surface of said mold and the other at the outer surface of said mold, and a third tongue extending across between said parallel tongues at the top of said jaw members, said members having chambers arranged between said inner and outer parallel tongues and below said third tongues, said chambers communicating with the interior of said mold, and means to draw water from the mold through said chambers.

52. In a machine of the character described, a vertically-movable head-plate mounted on suitable guides, a screw connected to said head-plate and secured against rotation, a horizontal beveled gear interiorly screw-threaded and mounted around said screw, oppositely-extending shafts each carrying a beveled pinion, said pinions facing each other and meshing with said horizontal gear, and means to alternately revolve said shafts whereby said horizontal gear is revolved in opposite directions and the head-plate is raised and lowered.

53. In a machine of the character described, a contractible mold comprising a plurality of jaw members, means to open and close said jaw members including vertically-movable rods and a head-plate to which said rods are secured, a screw connected to said plate and secured against rotation, a horizontal beveled gear interiorly screw-threaded and mounted on said screw, oppositely-extending shafts each carrying a beveled pinion, said pinions facing each other and meshing with said horizontal gear, and means to alternately revolve said shaft whereby said horizontal gear is revolved in opposite directions and the head-plate and jaw-operating rods are raised and lowered.

54. In a machine of the character described, a vertically-movable head-plate mounted on suitable guides, a screw connected to said head-plate and secured against rotation, a horizontal beveled gear interiorly screw-threaded and mounted upon said screw, oppositely-extending shafts, each carrying a beveled pinion and a loose gear, said pinions facing each other and meshing with said horizontal gear, clutches on said shafts to engage said loose gears, and means to alternately throw in said clutches for the purpose specified.

55. In a machine of the character described, a vertically-movable head-plate mounted on suitable guides, a screw connected to said head-plate and secured against rotation, a horizontal beveled gear interiorly screw-threaded and mounted upon said screw, oppositely-extending shafts, each carrying a beveled pinion and a loose gear, said pinions meshing with said horizontal gear, clutches on said shafts to engage said loose gears, means to alternately throw in said clutches and means to hold said clutches out at times for the purpose specified.

56. In a machine of the character described, a vertically-movable head-plate mounted on suitable guides, a screw connected to said head-plate and secured against rotation, a horizontal beveled gear interiorly screw-threaded and mounted upon said screw, oppositely-extending shafts, each carrying a beveled pinion and a loose gear, said pinions meshing with said horizontal gear, clutches on said shafts to engage said loose gears, a gear-wheel having cams on the sides of its periphery, a longitudinally-movable rod having projecting rollers engaging said cams, pivoted levers engaging said clutches and adapted to be actuated by the longitudinal movement of said rod and means to revolve said cam-carrying gear for the purpose specified.

57. In a machine of the character described, a vertically-movable head-plate mounted on suitable guides, a screw connected to said head-plate and secured against rotation, a horizontal beveled gear interiorly screw-threaded and mounted upon said screw, oppositely-extending shafts, each carrying a beveled pinion and a loose gear, said pinions meshing with said horizontal gear, clutches on said shafts to engage said loose gears, a gear-wheel having cams on the sides of its periphery, each cam having three surfaces which are arranged in inverse order on opposite sides of said gear, a longitudinally-movable rod having projecting rollers engaging said cams, pivoted levers engaging said clutches and adapted to be actuated by said longitudinally-movable rod, and means to revolve said cam-carrying gear for the purpose specified.

58. In a machine of the character described, a contractible mold comprising a plurality of jaw members, means to open and close said jaw members including vertically-movable rods and a head-plate to which said rods are secured, a screw connected to said plate and secured against rotation, a horizontal beveled gear interiorly screw-threaded and mounted upon said screw, oppositely-extending shafts, each carrying a beveled pinion and a loose gear, said pinions meshing with said horizontal gear, clutches on said shafts to engage said loose gears, a gear-wheel having cams on the sides of its periphery, a longitudinally-movable rod having projecting rollers engaging said cams, pivoted levers engaging said clutches and adapted to be actuated by said longitudinally-movable rod, and means to revolve said cam-carrying wheel for the purpose specified.

59. In a machine of the character described, a mold, a vertically-movable plunger-rod, a mandrel mounted on the end of said plunger-rod and adapted to enter said mold on the downward stroke of said rod, a crank-shaft carrying a crank adapted to reciprocate said plunger-rod, a gear with interrupted teeth on said shaft, another gear with interrupted teeth adapted at intervals during its rotation to mesh with said first-mentioned gear, and means to revolve said second gear whereby said plunger-rod is periodically raised and lowered.

60. In a machine of the character described, a contractible mold comprising a plurality of jaw members, means to open and close said jaw members including vertically-movable rods and a head-plate to which said rods are secured, a hollow screw connected to said plate and secured against rotation, a horizontal beveled gear interiorly screw-threaded and mounted on said screw, a plunger-rod extending up through said hollow screw, a mandrel secured to the end of said plunger-rod, means to periodically reciprocate said plunger-rod, and means to revolve said horizontal gear first in one direction, then in another and to leave said gear stationary at the times when said plunger-rod is being reciprocated.

61. In a machine of the character described, a contractible mold comprising a plurality of jaw members, means to open and close said jaw members periodically, a plunger-rod, a collapsible mandrel mounted on said rod and adapted to enter said mold on the downstroke of said rod and means to reciprocate said plunger-rod at intervals when the mold is open.

62. In a machine of the character described, a contractible mold comprising a plurality of jaw members, means to open and close said jaw members periodically, a plunger-rod, a mandrel mounted on said rod and adapted to enter said mold on the downstroke of said rod, means to reciprocate said plunger-rod at intervals when the mold is open, a cup for feeding material to the mold and means to automatically operate said cup while said mold is open and said mandrel is up.

63. In a machine of the character described, a contractible mold, means to open and close said mold periodically, a plunger-rod, a mandrel mounted on said rod, a crank-shaft carrying a crank adapted to reciprocate said plunger-rod, a cam on said shaft, a cup for feeding material to the mold, means of connection between said cam and cup whereby the former will operate the latter, and means to revolve the crank-shaft, at intervals when the mold is open to operate the cam for actuating the feeding-cup and turn said crank to lower and raise the mandrel.

64. A machine of the character described having a contractible mold comprising a plurality of interlocking jaw members, each member having an extending tongue engaging a groove in the adjacent member, each of said tongues having projecting lugs at the upper and lower extremities of its end extending into sockets in the adjacent jaw member for the purpose specified, and means to move said jaw members to open and close the mold.

In testimony whereof I affix my signature in presence of two witnesses.

WILLIAM EDWIN SCHNEIDER.

Witnesses:
   GEO. A. HUTCHINSON,
   E. S. ELLIOTT.